US008768261B2

(12) United States Patent
Tong et al.

(10) Patent No.: US 8,768,261 B2
(45) Date of Patent: Jul. 1, 2014

(54) APPARATUS AND METHOD FOR REDUCING INTERFERENCES BETWEEN BASE STATIONS IN WIRELESS COMMUNICATION SYSTEM

(75) Inventors: Hui Tong, Beijing (CN); Ming Xu, Beijing (CN); Masayuki Hoshino, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 13/257,692

(22) PCT Filed: Mar. 19, 2010

(86) PCT No.: PCT/JP2010/002002
§ 371 (c)(1),
(2), (4) Date: Nov. 3, 2011

(87) PCT Pub. No.: WO2010/106819
PCT Pub. Date: Sep. 23, 2010

(65) Prior Publication Data
US 2012/0040701 A1 Feb. 16, 2012

(30) Foreign Application Priority Data

Mar. 20, 2009 (CN) .......................... 2009 1 0126854

(51) Int. Cl.
*H04B 1/00* (2006.01)
*H04B 17/00* (2006.01)
*H04B 1/10* (2006.01)

(52) U.S. Cl.
USPC ................... 455/67.11; 455/67.13; 455/63.1; 455/226.1; 455/296

(58) Field of Classification Search
USPC .......... 455/522, 69, 67.11, 67.13, 63.1, 226.1
See application file for complete search history.

(56) References Cited

U.S. PATENT DOCUMENTS 7,280,811 B2   10/2007   Sugiyama et al.
7,421,261 B2 *  9/2008   Sahlin et al. .................. 455/135

(Continued)

FOREIGN PATENT DOCUMENTS

CN       1578175 A       2/2005
WO    2007/123029 A1    11/2007

OTHER PUBLICATIONS

Mitsubishi Electric, "Leakage-based precoding for CoMP in LTE-A", 3GPP RAN1 #56, [online], Feb. 13, 2009, R1-090596 [retrieved on Apr. 6, 2010]. Retrieved from the Internet: <URL: http://www.3gpp.org/FTP/tsg_ran/WG1_RL1/TSGR1_56/Docs/R1-09056.zip>.

(Continued)

*Primary Examiner* — Tilahun B Gesesse
(74) *Attorney, Agent, or Firm* — Pearne & Gordon LLP

(57) ABSTRACT

A method for reducing interferences between base stations in a communication system having a plurality of base stations. This method comprises the steps of: causing a user station to receive both a signal transmitted by a local-cell base station and a signal transmitted by an adjacent-cell base station, thereby measuring the SNR of the interfered link and the SNR of the leak link of the adjacent-cell base station; calculating a weighting factor of a leak power based on the measured SNR of the interfered link and the measured SNR of the leak link of the adjacent-cell base station; and determining, based on the calculated weighting factor, whether or not the leak power has to be suppressed and to what degree such suppression has to be performed.

25 Claims, 10 Drawing Sheets

(56) References Cited

U.S. PATENT DOCUMENTS

| | | | |
|---|---|---|---|
| 2005/0032493 A1 | 2/2005 | Sugiyama et al. | |
| 2007/0248172 A1* | 10/2007 | Mehta et al. | 375/260 |
| 2008/0165874 A1* | 7/2008 | Steele et al. | 375/261 |

OTHER PUBLICATIONS

Wang Jing-Jing, et al., "Dynamic power allocation based on SLNR precoding for Multi-User MIMO downlink", Wireless Communications, Networking and Mobile Computing, 2008. WiCOM '08. 4th International Conference on, Nov. 18, 2008, pp. 1-4.

Mitsubishi Electric, "Low-Complexity Precoding for LTE-A Collaborative MIMO: A Signal Leakage Approach", 3GPP RAN#55, Nov. 10-14, 2008, Prague, Czech Republic, R1-084482.

International Search Report for PCT/JP2010/002002 dated Apr. 27, 2010.

English Translation for Chinese Search Report for Application No. 201080012360 dated Sep. 4, 2013.

* cited by examiner

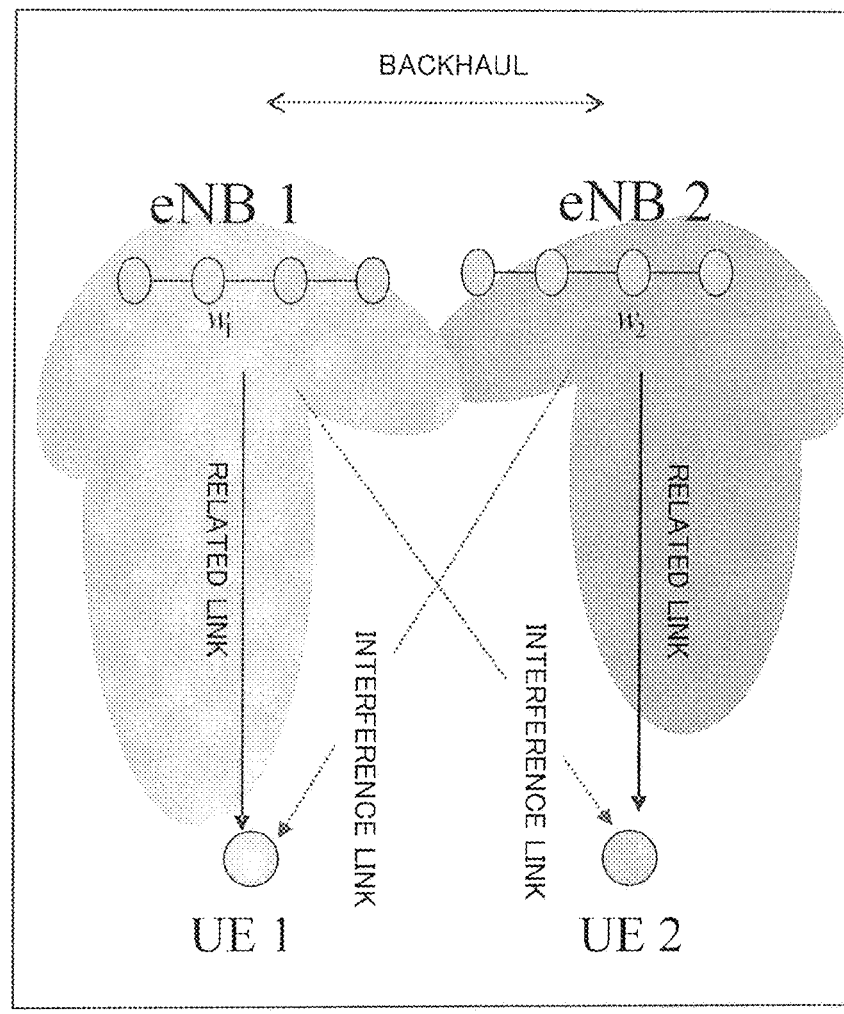
PRIOR ART  FIG.1

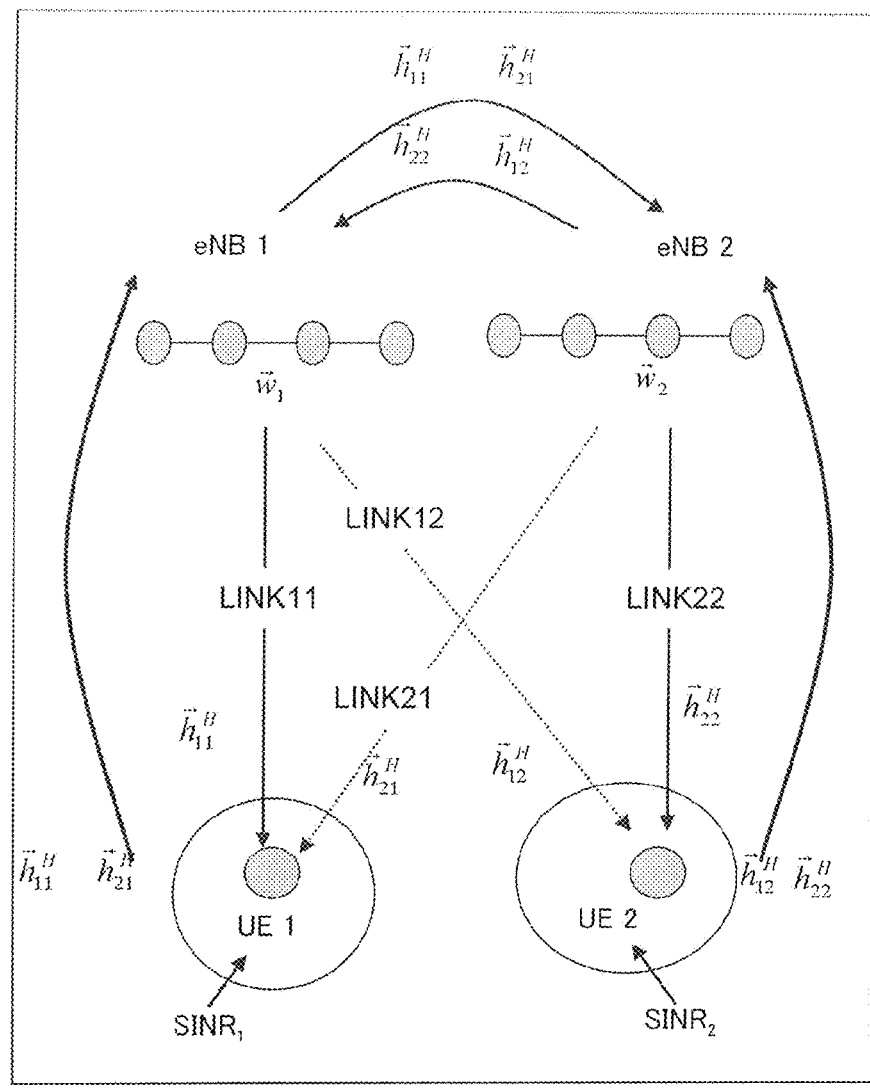
PRIOR ART  FIG.2

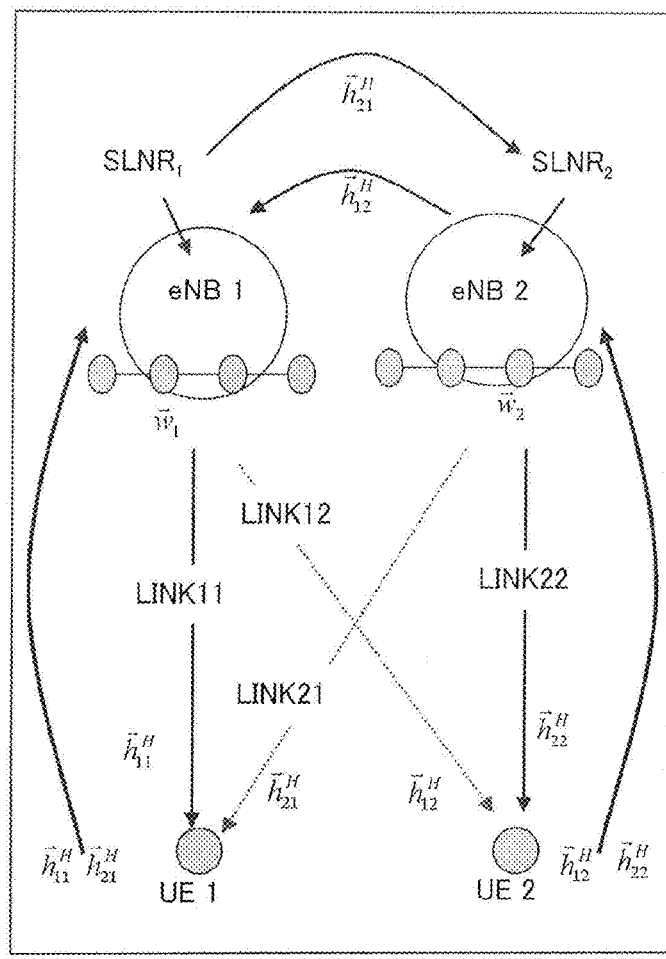
PRIOR ART    FIG.3
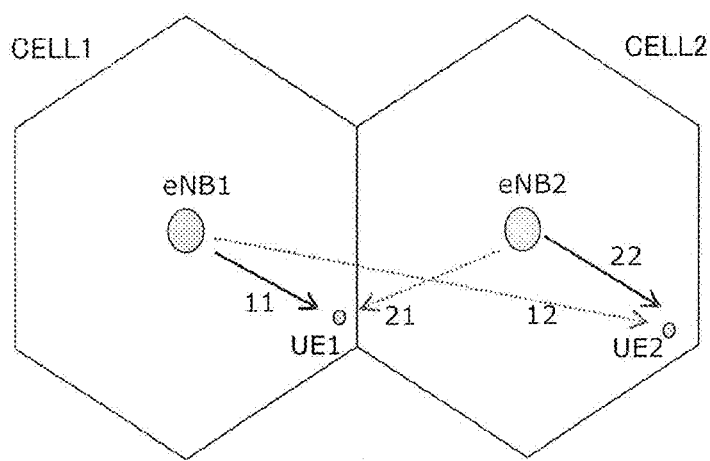
PRIOR ART    FIG.4

APPARATUS AND METHOD FOR REDUCING INTERFERENCES BETWEEN BASE STATIONS IN WIRELESS COMMUNICATION SYSTEM

CROSS-REFERENCES TO RELATED APPLICATIONS

This application is entitled to the benefit of Chinese Patent Application No. 200910126854.3 filed on Mar. 20, 2009, the disclosure of which including the specification, drawings and abstract is incorporated herein by reference in its entirety.

TECHNICAL FIELD

The present invention relates to an apparatus and method for reducing interference between base stations in a radio communication system, and more particularly, to an apparatus and method for determining whether or not to suppress inter-cell interference between base stations in neighboring cells in a communication system with a plurality of base stations based on a signal-to-noise ratio (SNR) of a leak link and an SNR of an interfered link of the base stations in the neighboring cells.

BACKGROUND ART

In a radio communication system, a mobile terminal communicates with another mobile terminal via a base station in a cell to which the mobile terminal belongs. In an environment of radio communication, the mobile terminal receives not only a signal transmitted from the base station in the cell to which the mobile terminal belongs but also signals transmitted from a base station in a neighboring cell, but the signals from the base station in the neighboring cell are not communication signals that the mobile terminal desires to receive and these signals constitute interference signals for the mobile terminal. That is, the mobile terminal receives inter-cell interference in the communication process. When the mobile terminal is located at a cell edge, inter-cell interference becomes stronger. This also constitutes a main factor for limiting the throughput of the signal. Therefore, the suppression of inter-cell interference is an important challenge to the radio communication system.

To remove inter-cell interference, a prior art performs communication according to a scheme of coordination among a plurality of base stations and effectively suppresses inter-cell interference. According to the scheme of coordination among a plurality of base stations, a plurality of antennas are arranged in the base station and directivities of the antennas can be changed by a precoding vector of an antenna array. When a plurality of base stations coordinate, channel information of the mobile terminal is transmitted to base stations causing interference with the user via a backhaul link. In such a case, the base stations can avoid interference with the mobile terminal in question by setting the precoding vector and also enhance the link with mobile terminals which belong thereto.

FIG. 1 shows an image illustrating how multiple antennas of a plurality of base stations used in the prior art remove inter-cell interference. As shown in FIG. 1, in the multiantenna system with the plurality of base stations, base station 1 (eNB 1) communicates with mobile terminal 1 (UE 1) via a related link and base station 2 (eNB 2) communicates with mobile terminal 2 (UE 2) via a related link. When mobile terminal 1 and mobile terminal 2 are located at a cell edge, in a downlink direction from the base station to the mobile terminal, a signal transmitted from base station 1 to mobile terminal 1 in the subject cell causes interference with mobile terminal 2 in the neighboring cell via an interference channel. Similarly, a signal transmitted from base station 2 to mobile terminal 2 in the subject cell also causes interference with mobile terminal 1 in the neighboring cell via an interference channel. To remove inter-cell interference, the backhaul of base station 1 and base station 2 can exchange information between the backhaul of base station 1 and base station 2 by making connections according to a wired scheme or wireless scheme such as optical fiber and channel. Through information exchange between the base stations, multiple antennas are arrayed in the respective base stations through precoding so as to prevent the antennas of base station 1 from being directed to mobile terminal 2 in the neighboring cell and prevent the antennas of base station 2 from being directed to mobile terminal 1 in the neighboring cell, and it is thereby possible to avoid inter-cell interference.

The conventional method of setting a precoding vector is based on optimization for a signal to interference noise ratio (SINR). FIG. 2 shows an image of calculating inter-cell interference. In FIG. 2, base station 1 (eNB 1) communicates with mobile terminal 1 (UE 1) via communication link 11 and base station 2 (eNB 2) communicates with mobile terminal 2 (UE 2) via communication link 22. Furthermore, a signal transmitted from base station 1 to mobile terminal 1 in the subject cell causes interference with mobile terminal 2 in the neighboring cell via interference link 12. Similarly, a signal transmitted from base station 2 to mobile terminal 2 in the subject cell also causes interference with mobile terminal 1 in the neighboring cell via interference link 21. To reduce inter-cell interference, it is desirable to intensify precoding vectors in the directions of link 11 and link 22 and reduce precoding vectors in the directions of link 12 and link 21.

To set such precoding vectors, the prior art optimizes the SINR and thereby sets precoding vectors capable of reducing inter-cell interference. Assuming that the base station side has a plurality of antennas and the user side has one antenna, the SINR can be expressed by following equation 1.

(Equation 1)

$$SINR_1 = \frac{\text{link 11}}{\text{noise} + \text{link 21}} = \frac{\left|\vec{h}_{11}^H \cdot \vec{w}_1\right|^2 \cdot P_1}{\sigma^2 + \left|\vec{h}_{21}^H \cdot \vec{w}_2\right|^2 \cdot P_2}, \quad [1]$$

and $$SINR_2 = \frac{\text{link 22}}{\text{noise} + \text{link 12}} = \frac{\left|\vec{h}_{22}^H \cdot \vec{w}_2\right|^2 \cdot P_2}{\sigma^2 + \left|\vec{h}_{12}^H \cdot \vec{w}_1\right|^2 \cdot P_1}$$

Here, SINR1 and SINR2 represent SINRs of user 1 and user 2 respectively, P1 and P2 represent transmission power of base station 1 and base station 2 respectively, $\sigma^2$ represents noise power of the user, $\vec{w}_1$ and $\vec{w}_2$ represent precoding vectors of base station 1 and base station 2 respectively and $\vec{h}_{mn}$ represents a channel vector from base station m to user n (m=1, 2, n=1, 2).

By optimizing equation 1 above, it is possible to find out the amount of precoding that maximizes the sum of rates of two user stations using equation 2 below.

(Equation 2)

$$\operatorname*{argmax}_{\vec{w}_1,\vec{w}_2}\log(1+SINR_1)+\log(1+SINR_2) \quad [2]$$

Finding out the amount of precoding that maximizes the sum of rates of the two user stations makes it possible to effectively improve the system throughput.

SUMMARY OF INVENTION

Technical Problem

However, the above SINR-based method has the following disadvantages. First, such a method needs to simultaneously optimize base station 1 and base station 2, that is, simultaneously include w1→ and w2→ in an optimization target. Thus, the system becomes more complicated. Next, such a method requires both base station 1 and base station 2 to know channel information of all users, causing exchange of a large amount of information through a backhaul link. Depending on the situation, the backhaul of the system is not always provided with a sufficient capacity to exchange information.

With respect to the above disadvantage of the SINR method, a concept of SLNR (signal to leak noise ratio) is proposed. FIG. 3 shows an image of calculating inter-cell interference based on an SLNR. The SINR is a concept on the receiving side, which divides a received signal into a desired signal and an interference signal and calculates a ratio thereof (including noise). On the other hand, the SLNR is a concept on the transmitting side. This divides a transmission signal into signal and leak portions. By this means, base station 1 has only two portions of a w1→ signal and a leak and base station 2 has only two portions of a w2→ signal and a leak. By calculating the ratio (including noise), it is possible to obtain SLNRs of base station 1 and base station 2. The SLNR can be expressed by following equation 3.

(Equation 3)

$$SLNR_1 = \frac{\text{link } 11}{\text{noise} + \text{link } 12} = \frac{\left|\vec{h}_{11}^H \cdot \vec{w}_1\right|^2 \cdot P_1}{\sigma^2 + \left|\vec{h}_{12}^H \cdot \vec{w}_1\right|^2 \cdot P_1}, \quad [3]$$

and $$SLNR_2 = \frac{\text{link } 22}{\text{noise} + \text{link } 21} = \frac{\left|\vec{h}_{22}^H \cdot \vec{w}_2\right|^2 \cdot P_2}{\sigma^2 + \left|\vec{h}_{21}^H \cdot \vec{w}_2\right|^2 \cdot P_2}$$

Here, SLNR1 and SLNR2 represent SLNRs of user 1 and user 2 respectively. Other mathematical symbols have the same meanings as those shown in equation 1.

After calculating SLNR1 and SLNR2 which are the SLNRs of base station 1 and base station 2, the SLNRs can be optimized using equation 4 below.

(Equation 4)

$$\operatorname*{argmax}_{\vec{w}_1} SLNR_1, \text{ and } \operatorname*{argmax}_{\vec{w}_2} SLNR_2 \quad [4]$$

Here, it is obvious that w1→ and w2→ can be optimized by introducing the SLNRs. Thus, while the complexity of the system is reduced, the necessary amount of channel information exchanged decreases appropriately, and it is thereby possible to still suppress inter-cell interference effectively and enhance the signal intensity.

The SLNR has the above merits, but the SLNR-based optimization may influence the performance thereof depending on the situation.

FIG. 4 shows an image illustrating how SLNR-based optimization influences the optimization effect. In FIG. 4, user station (UE) 1 is located at edges of cell 1 and cell 2, base station 2 (eNB 2) has a strong interference on user station 1. However, user station (UE) 2 is located, not at the edges of cell 1 and cell 2, but at an edge of cell 2 far from cell 1. Therefore, the interference of base station 1 (eNB 1) on user station 2 is small. As shown in FIG. 4, when the interference of base station 1 with user station 2 is by far smaller than that of the signal transmitted from base station 2 to user station 2, base station 1 need not suppress the leak to user 2. However, according to the conventional SLNR, in this case, base station 1 still needs to suppress the leak to user 2.

When the leak of base station 1 to user 2 need not be suppressed, the setting of a precoding vector to base station 1 needs only to find out one precoding vector capable of maximizing |h11H·w1→|2. However, if the leak needs to be suppressed, for an optimum (maximized SLNR) precoding vector, not only |h11H·w1→|2 needs to be increased but also |h12H·w1→|2 needs to be reduced and the two objects are compatible with each other in the final result. Therefore, when the leak need not be suppressed, if the leak is suppressed, |h11H·w1→|2 obtained is smaller than an optimal case, quality of the communication link degrades and performance deteriorates.

Solution to Problem

It is therefore an object of the present invention to provide a signal transmitting apparatus and method applicable to a multiantenna communication system with a plurality of base stations. The apparatus and method according to the present invention introduce an SNR ratio as a weight value of leak power and thereby improve a conventional SINR and an SLNR-based scheme. It is possible to automatically adjust whether or not leak needs to be suppressed based on a weighting coefficient of leak power.

One aspect of the present invention is to provide a method of reducing interference between base stations in a communication system with a plurality of base stations, including a step of a user station receiving signals transmitted from a base station in a subject cell and a base station in a neighboring cell and thereby measuring an SNR of an interfered link and an SNR of a leak link of the neighboring cell base station, a step of calculating a weighting coefficient of leak power based on the measured SNR of the interfered link and the SNR of the leak link of the neighboring cell base station and a step of determining whether or not the leak power needs to be suppressed based on the calculated weighting coefficient.

Another aspect of the present invention is to provide equipment that reduces interference between base stations in a communication system with a plurality of base stations, including an information extraction apparatus that extracts subject cell channel information and neighboring cell channel information, a ratio of a user SNR in a subject cell and a ratio of a user SNR in a neighboring cell from a received user signal, a data transmission parameter calculation apparatus that calculates a precoding matrix or precoding vector used for data transmission based on the received subject cell channel information, interference channel information on interference of the subject cell with the neighboring cell and neighboring cell user SNR ratio information, a reference signal parameter setting apparatus that sets a reference signal parameter and estimates subject cell downlink information or interference channel information on interference of the subject cell with the neighboring cell, a base station information exchange apparatus that exchanges information between the base stations and a base station signal transmitting apparatus that transmits data from the base station based on the set reference signal parameter and calculated precoding matrix or precoding vector.

A further aspect of the present invention is to provide equipment that reduces interference between base stations in a communication system with a plurality of base stations, including an information extraction and estimation apparatus that extracts data channel information and interference channel information from a signal transmitted from a base station and estimates a subject cell SNR and a neighboring cell SNR, an SNR ratio calculation apparatus that calculates a ratio between the estimated subject cell SNR and neighboring cell SNR and provides the calculated ratio to a user signal transmitting apparatus and the user signal transmitting apparatus that transmits the calculated ratio and user uplink data.

Compared to an SINR-based method, the method according to the present invention need not simultaneously optimize a precoding vector of each base station and can drastically reduce the amount of information exchange of a backhaul link.

Furthermore, compared to the SLNR-based method, the method according to the present invention introduces the SNR ratio as a weight value of leak power. Therefore, the merit of the present invention over the conventional SLNR is that the present invention can function even when the leak link is weaker than the interfered link.

BRIEF DESCRIPTION OF DRAWINGS

FIG. 1 shows an image illustrating how multiple antennas of a plurality of base stations used in a prior art remove inter-cell interference;

FIG. 2 shows an image illustrating how the amount of precoding of a base station that reduces inter-cell interference is calculated based on an SINR according to a prior art;

FIG. 3 shows an image illustrating how the amount of precoding of a base station that reduces inter-cell interference is calculated based on an SLNR according to a prior art;

FIG. 4 shows an image illustrating influences of SLNR-based optimization on the optimization effect of the prior art;

DESCRIPTION OF EMBODIMENTS

Figure 5:
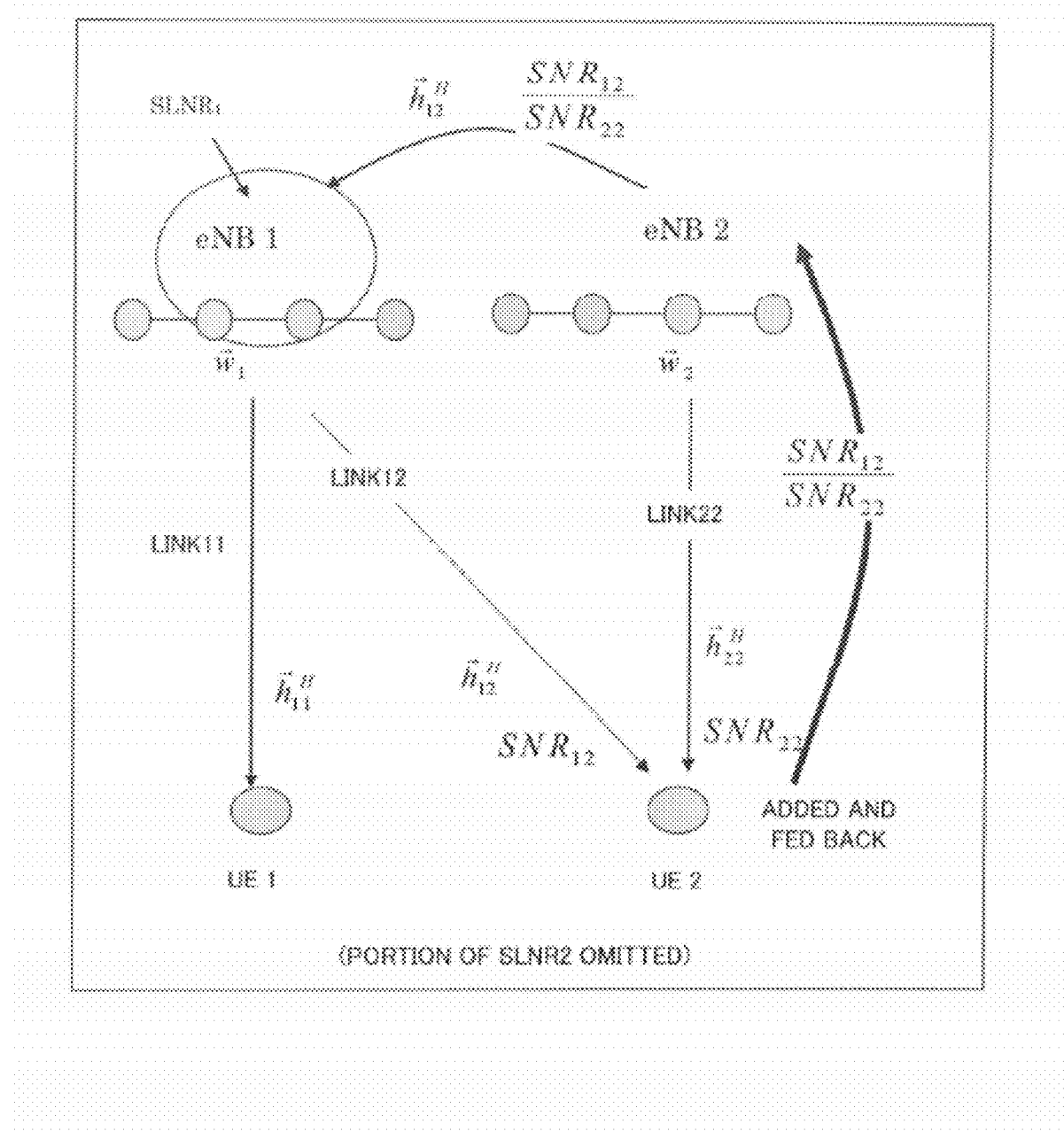
FIG. 5 shows an image illustrating how the SNR ratio according to the present invention is introduced as a weight value of leak power.

Hereinafter, embodiments of the present invention will be described in detail with reference to the accompanying drawings. Descriptions of details and functions unnecessary for the present invention will be omitted to avoid confusion in understanding of the present invention.

In the following descriptions, the same apparatus or equipment will be assigned the same reference numerals among different drawings.

FIG. 5 shows an image illustrating how an SNR ratio according to the present invention is introduced as a weight value of leak power.

Hereinafter, a specific example where an SNR ratio is introduced as a weight value of leak power according to the present invention will be described with reference to FIG. 5. The situation shown in FIG. 5 is an example shown only to describe the present invention. The present invention is not limited to this particular example, but the basic thought and concept thereof are also applicable to other situations.

As shown in FIG. 5, base station 1 (eNB 1) communicates with user station 1 (UE 1) via communication link 11 and base station 2 (eNB 2) communicates with user station 2 (UE 2) via communication link 22. Furthermore, a signal transmitted by base station 1 to user station 1 in the subject cell causes interference with user station 2 in the neighboring cell via interference link 12. Here, assuming that user station (UE) 1 is located at an edge in cell 1 far from cell 2, interference of base station 2 (eNB 2) with user station 1 can be drastically reduced compared to the signal transmitted by base station 1 to user station 1. Base station 2 need not suppress a leak to user station 1, but base station 1 needs to suppress interference with user station 2.

To solve the problem that the quality of a communication link deteriorates and the performance deteriorates by suppressing a leak of the appropriate base station even when the SNR of the leak link is small, the present invention provides an SLNR signal transmission method through weighting of the SNR ratio.

The present invention allows one weighting coefficient to be added to leak power. Since this weighting coefficient reflects relative intensity between a leak link and an interfered link, it is possible to control whether or not to suppress inter-cell interference of the base station in the neighboring cell with the appropriate user station in the subject cell through the weighting coefficient. To be more specific, when the leak link is by far weaker than the interfered link, this weighting coefficient decreases and the appropriate SLNR optimization never suppresses the leak. On the other hand, when the leak link is stronger than the interfered link, this weighting coefficient increases and the appropriate SLNR optimization tries to reduce the leak to a minimum.

For this reason, as a specific example, the ratio between the SNR of the leak link and the SNR of the interfered link can be selected as a possible weighting coefficient and equation 5 expressing the modified SLNR is obtained.

(Equation 5)

-continued $$SLNR_1 = \frac{\left|\vec{h}_{11}^H \cdot \vec{w}_1\right|^2 \cdot P_1}{\sigma^2 + \frac{SNR_{12}}{SNR_{22}} \cdot \left|\vec{h}_{12}^H \cdot \vec{w}_1\right|^2 \cdot P_1} \qquad [5]$$

In equation 5, SNR12 represents the SNR of the leak link, SNR22 represents the SNR of the interfered link, and the same reference numerals in other equations 1 to 4 represent the same parameters. When this weighting coefficient is applied, it is possible to solve the conventional problem with SLNRs by determining whether or not it is necessary to suppress corresponding leak power based on the optimization of this improved SLNR and according to the link qualities of the leak link and interfered link.

To be more specific, as shown in equation 1 above, |h12H→·w1→|2·P1 in equation 5 is leak power that produces interference of base station 1 with user station 2. SNR12/SNR22 becomes a weighting coefficient of the leak interference and reflects relative intensity of the leak link and the interfered link. When the leak link is by far weaker than the interfered link, the value of ratio SNR12/SNR22 is small and there is no attempt to suppress the leak by ignoring the leak link, and therefore when the leak is taken into consideration, optimizing the precoding vector of the SLNR makes it possible to avoid the problem that quality of the communication link deteriorates. On the other hand, when the leak link is stronger than the interfered link, the value of ratio SNR12/SNR22 cannot be ignored. In such a case, it is necessary to optimize the precoding vector of the SLNR by taking leak interference |h12H→·w1→|2·P1 of base station 1 with user station 2 into consideration and reduce inter-cell leak interference.

An equation is derived with a weighting coefficient added to the leak link by taking the above SLNR of base station 1 as an example. Similarly, the SLNR for base station 2 can be expressed by equation 6 below.

(Equation 6)

$$SLNR_2 = \frac{\left|\vec{h}_{22}^H \cdot \vec{w}_2\right|^2 \cdot P_2}{\sigma^2 + \frac{SNR_{21}}{SNR_{11}} \left|\vec{h}_{21}^H \cdot \vec{w}_2\right|^2 \cdot P_2} \qquad [6]$$

Weighting coefficients of leak interference SNR12/SNR22 and SNR21/SNR11 can be obtained using the method shown in the following embodiment.

(Embodiment 1)

Figure 6:
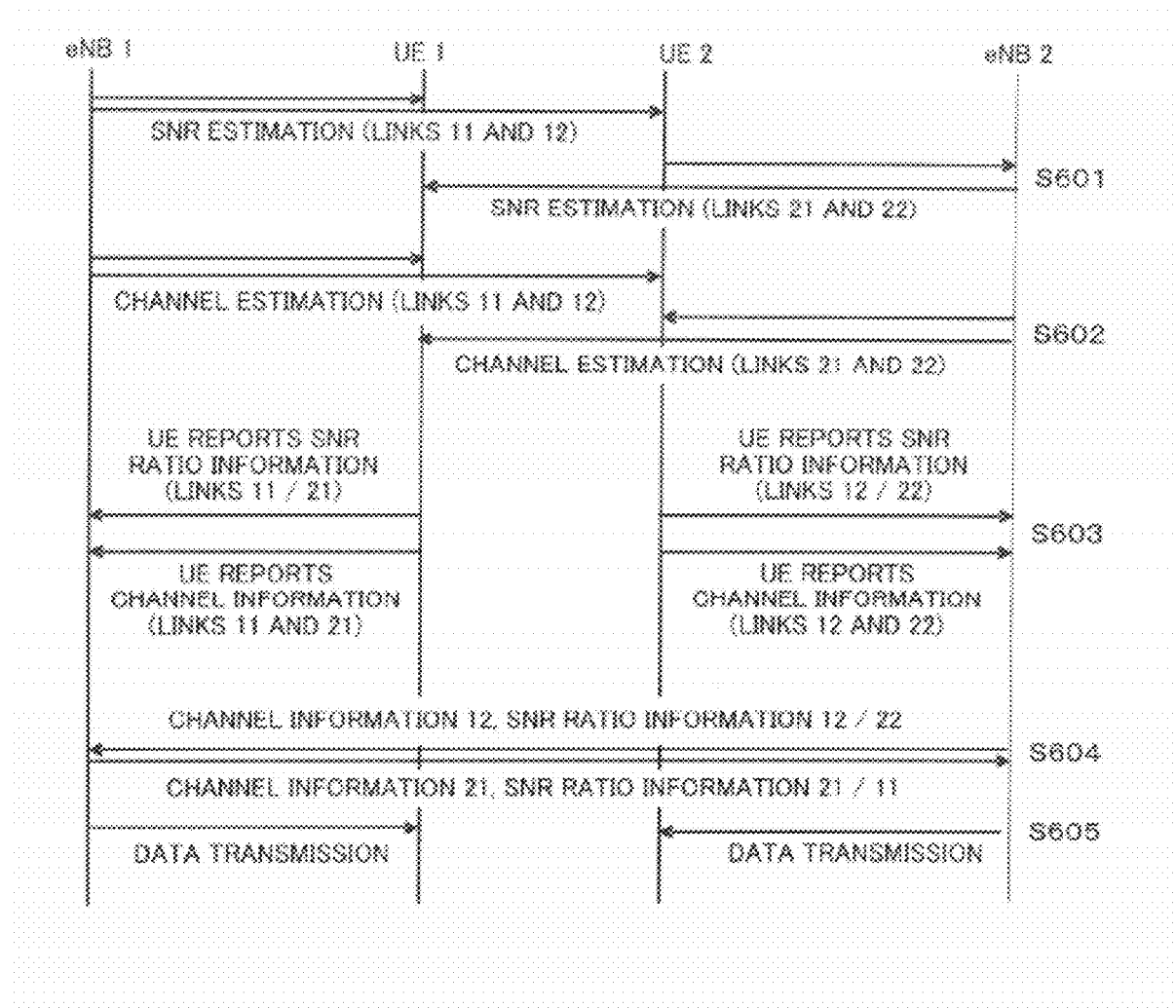
FIG. 6 is a flowchart of Embodiment 1 relating to a signaling flow of the present invention.

FIG. 6 is a flowchart of Embodiment 1 relating to a signaling flow of the present invention. For simplicity of explanation, a signaling flow performed by the base station and the user station will be shown by taking two neighboring base stations and two user stations to which the two base stations provide their respective services as an example.

As shown in FIG. 6, in step S601, base station 1 (may also be called "eNB 1" or "first base station") transmits a signal to user station 1 (may also be called "UE 1" or "first user station") and user station 2 (may also be called "UE 2" or "second user station"). User station 1 and user station 2 receive the signal transmitted from base station 1, and user station 1 and user station 2 can measure SNR11 which is the SNR of the data link from base station 1 to user station 1 and SNR12 which is the SNR of the leak link up to user station 2 from, for example, a preamble signal transmitted by the base station. Similarly, base station 2 (may also be called "eNB 2" or "second base station") transmits a signal to user station 2 (UE 2) and user station 1 (UE 1). User station 2 and user station 1 receive the signal transmitted from base station 2, and user station 2 and user station 1 can measure SNR22 which is the SNR of the data link from base station 2 to user station 2 and SNR21 which is the SNR of the leak link up to user station 1 from, for example, a preamble signal transmitted by base station 2. User station 1 and user station 2 obtain parameters w, P and σ based on the signal received from the base stations. The root mean square deviation of noise of the user station represented by parameter σ is obtained by one of the following two types of methods.

Method 1: In view of the fact that the root mean square deviation of noise is a characteristic of the user station and assuming that this characteristic has not been basically changed after shipment of the equipment, the user station is assumed to already know this information. When entering a network (connection with the base station is established), the user station can report this information to the base station.

Method 2: Assuming that the root mean square deviation of noise may change, the user station can measure the received power when the base station transmits no signal and this power becomes the square of the root mean square deviation of noise.

P represents transmission power of the base station. The maximum transmission power is known to the base station. The substantial transmission power is normally equivalent to the maximum transmission power. Depending on the situation, the substantial transmission power is determined by a scheduler of the base station.

The term w represents a precoding vector that needs to be optimized. This vector is identified by the data transmission parameter calculation apparatus of the base station.

In step S602, user station 1 measures data channel coefficient h11→ of the data channel from base station 1 to user station 1 and leak channel coefficient h21→ of the leak channel from base station 2 to user station 1 according to, for example, reference signals received from base station 1 and base station 2 respectively. User station 2 measures data channel coefficient h22→ of the data channel from base station 2 to user station 2 and leak channel coefficient h12→ of the leak channel from base station 1 to user station 2 according to, for example, reference signals received from base station 2 and base station 1 respectively.

In step S603, user station 1 feeds back leak channel coefficient h21→ and data channel coefficient h11→ obtained, and weighting coefficient SNR21/SNR11 of leak power of base station 2 with respect to user station 1 to base station 1. Similarly, user station 2 feeds back leak channel coefficient h12→ and data channel coefficient h22→ obtained, and weighting coefficient SNR12/SNR22 of leak power of base station 1 with respect to user station 2 to base station 2.

In step S604, base station 1 reports h21→ and ratio SNR21/SNR11 to base station 2 via a backhaul link. Similarly, base station 2 reports h12→ and ratio SNR12/SNR22 to base station 1 via the backhaul link.

In step S605, base station 1 and base station 2 calculate their respective precoding vectors based on the principle of optimizing the SLNRs expressed by equation 5 and equation 6 and transmit data to user station 1 and user station 2 respectively based on the calculated precoding vectors.

In the signaling flow in the above embodiment, the base station calculates the precoding vector transmit, and therefore the base station collects necessary information. However, the present invention is not limited to this, but the user station may calculate a precoding vector and feed back the precoding vector to the base station.

(Embodiment 2)

Embodiment 2 shows such a signaling flow that a user station calculates a precoding vector and the user station feeds back the calculated precoding vector to a base station.

Figure 7:
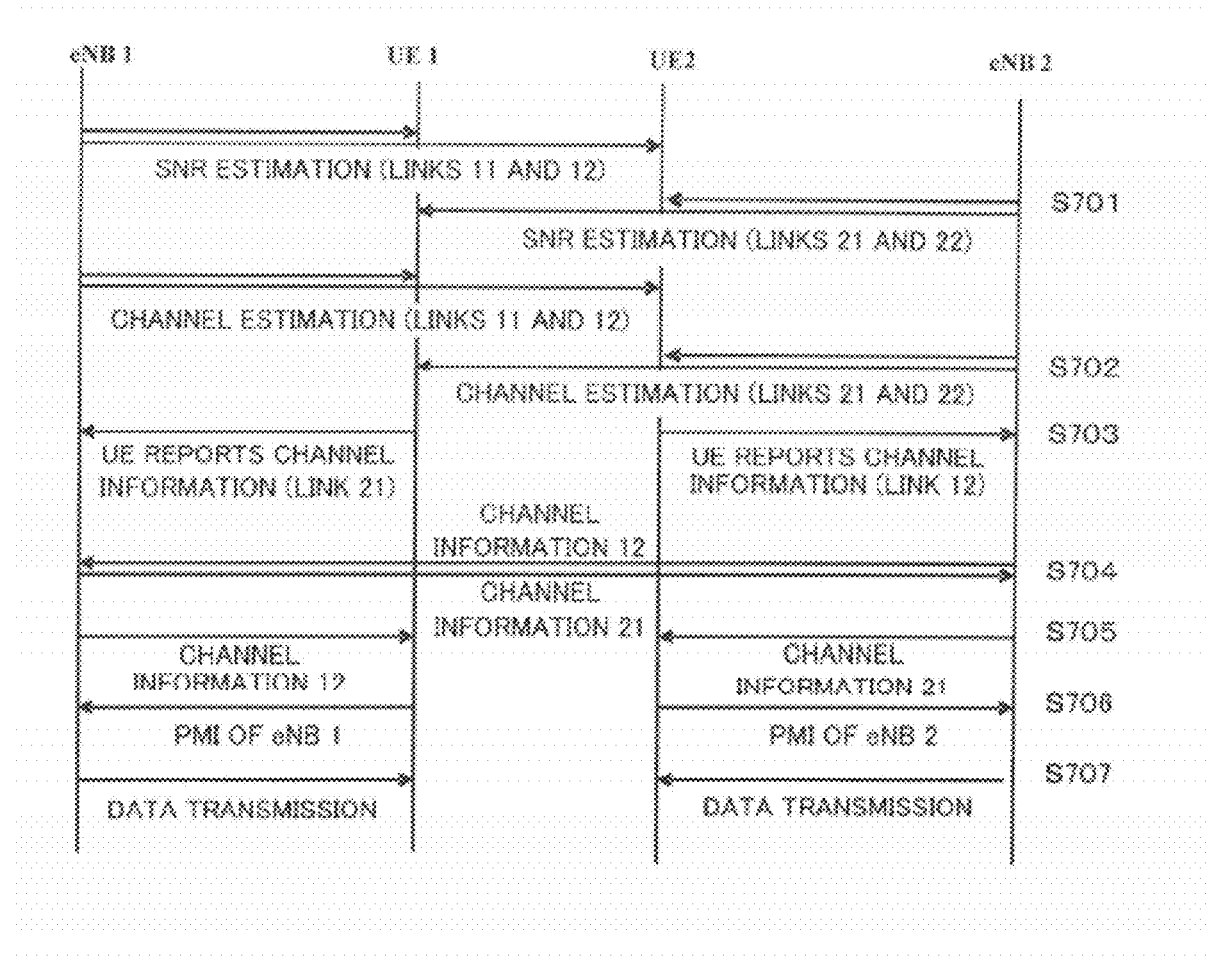
FIG. 7 is a flowchart of Embodiment 2 relating to a signaling flow of the present invention.

FIG. 7 shows a flowchart of Embodiment 2 relating to a signaling flow of the present invention. In Embodiment 2, user station 1 determines a precoding vector of base station 1, feeds back the precoding vector to base station 1 and user station 2 determines a precoding vector of base station 2 and feeds back the precoding vector to base station 2. As shown in FIG. 7, the flow in step S701 and step S702 in Embodiment 2 is the same as the flow in step S601 and step S602 in Embodiment 1, and therefore descriptions thereof will be omitted here.

In step S703, user 1 reports measured leak channel coefficient h21→ of base station 2 with respect to user station 1 to base station 1. Similarly, user station 2 reports measured leak channel coefficient h12→ of base station 1 with respect to user station 2 to base station 2.

In step S704, base station 1 reports h21→ to base station 2 via a backhaul link and base station 2 likewise reports h12→ to base station 1 via the backhaul link.

In step S705, base station 1 reports leak channel coefficient h12→ of base station 1 with respect to user station 2 reported from base station 2 to user station 1 and base station 2 reports leak channel coefficient h21→ of base station 2 with respect to user station 1 reported from base station 1 to user station 2.

In step S706, user station 1 calculates a precoding vector of base station 1 based on SNR11 and SNR21 which are the SNRs obtained in step S701 and leak channel coefficient h12→ of base station 1 with respect to user station 2 transmitted from base station 1 and according to the principle of maximizing the SLNR equation 5. Similarly, user station 2 calculates a precoding vector of base station 2 based on SNR12 and SNR22 which are the SNRs obtained in step S701 and leak channel coefficient h21→ of base station 2 with respect to user station 1 transmitted from base station 2 and according to the principle of maximizing the SLNR (equation 6). User station 1 then reports the calculated precoding vector of base station 1 to base station 1 and user station 2 reports the calculated precoding vector of base station 2 to base station 2.

In step S707, base station 1 and base station 2 transmit data to the respective user stations based on the precoding vectors reported from user station 1 and user station 2.

In Embodiment 1, all channel information needs to be reported through an uplink channel in the conventional flow. On the other hand, in Embodiment 2, half the channel information needs to be reported through a downlink channel and the other half of the channel information needs to be reported through an uplink channel in the signaling flow. In the majority of communication systems, Embodiment 2 can be implemented more easily taking account of the fact that the capacity of a downlink channel is greater than that of an uplink channel.

(Embodiment 3)

A situation has been described in Embodiment 2 in which the user station calculates a precoding vector and then feeds back the precoding vector to the base station. In Embodiment 2, user station 1 and user station 2 calculate precoding vectors of the base stations in the respective cells. In Embodiment 3 below, user station 1 and user station 2 calculate precoding vectors of the base stations in their respective neighboring cells.

Figure 8:
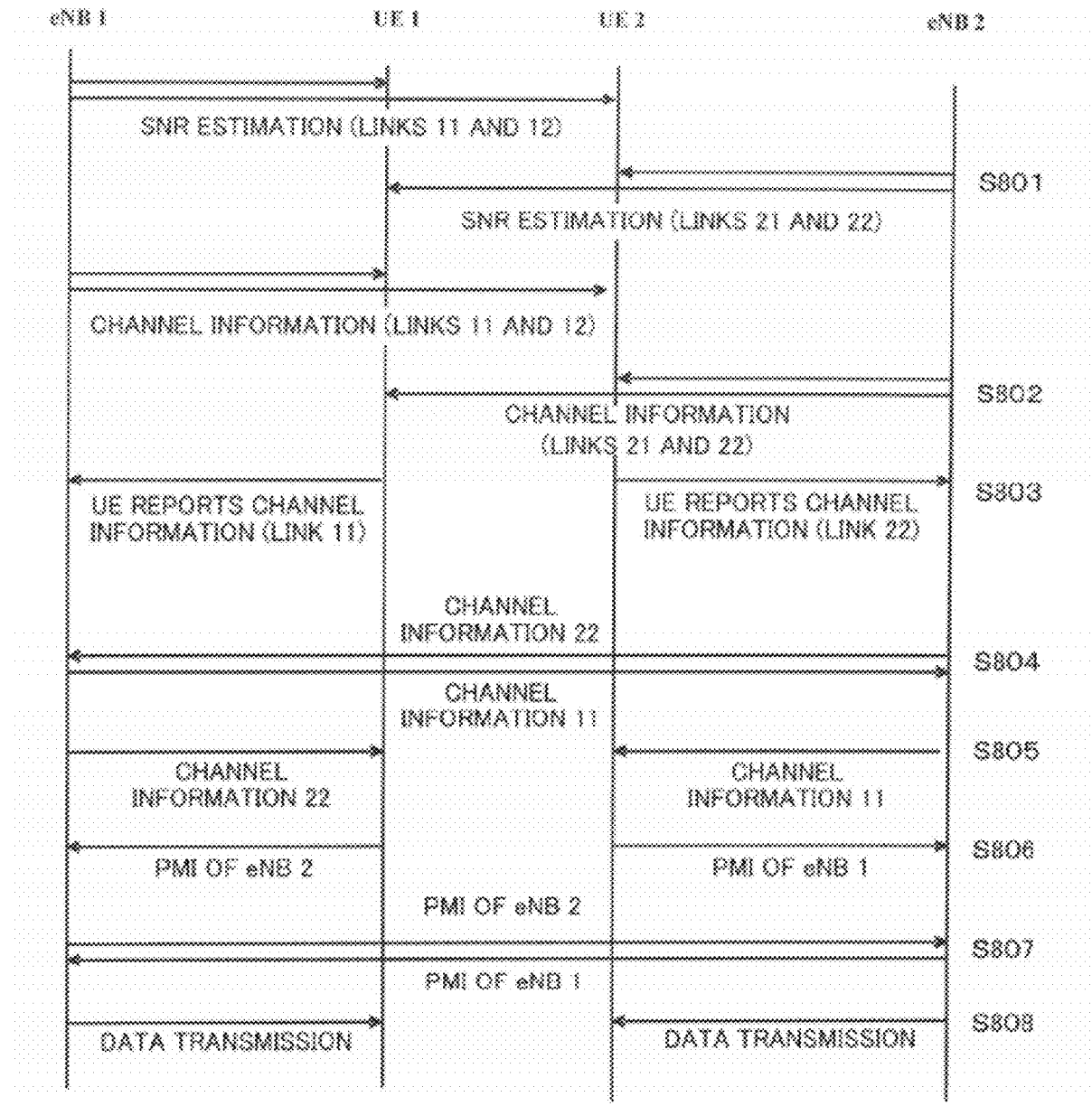
FIG. 8 is a flowchart of Embodiment 3 relating to a signaling flow of the present invention.

FIG. 8 shows a flowchart of Embodiment 3 relating to a signaling flow of the present invention. In Embodiment 3, user station 1 determines a precoding vector of base station 2 and feeds back the precoding vector to base station 1 and user station 2 determines a precoding vector of base station 1 and feeds back the precoding vector to base station 2. As shown in FIG. 8, the flow in step S801 and step S802 of Embodiment 3 is the same as the flow in step S701 and step S702 of Embodiment 2 (that is, step S601 and step S602 in Embodiment 1), and therefore descriptions thereof will be omitted here.

In step S803, user 1 reports measured data channel coefficient h11→ of base station 1 with respect to user station 1 to base station 1. Similarly, user 2 reports measured data channel coefficient h22→ of base station 2 with respect to user station 2 to base station 2.

In step S804, base station 1 and base station 2 exchange channel information h11→ and h22→ via a backhaul link, that is, base station 1 reports h11→ to base station 2 via the backhaul link and base station 2 likewise reports h22→ to base station 1 via the backhaul link.

In step S805, base station 1 provides h22→ reported from base station 2 to user station 1 and base station 2 provides h11→ reported from base station 1 to user station 2.

In step S806, user station 1 calculates a precoding vector of base station 2 based on SNR11 and SNR21 which are the SNRs obtained in step S801 and h22→ transmitted from base station 1 and according to the principle of maximizing the SLNR (equation 6). Similarly, user station 2 calculates a precoding vector of base station 2 based on SNR12 and SNR22 which are the SNRs obtained in step S801 and h11→ transmitted from base station 2 and according to the principle of maximizing the SLNR (equation 5). User station 1 then reports the calculated precoding vector of base station 2 to base station 1 and user station 2 reports the calculated precoding vector of base station 1 to base station 2.

In step S807, base station 1 reports the precoding vector of base station 2 calculated by user station 1 to base station 2 via a backhaul link and base station 2 reports the precoding vector of base station 1 calculated by user station 2 to base station 1 via the backhaul link.

In step S808, base station 1 and base station 2 transmit data to the respective user stations based on the precoding vectors calculated by user station 2 and user station 1.

In the signaling flow in Embodiment 3, it is not until data is exchanged twice in the backhaul that data transmission can be started, and therefore the delay thereof is greater than those of the other two methods.

In the signaling flows in Embodiment 1 to Embodiment 3, the respective steps can have different implementation methods, and, for example, in Embodiment 1, the user station needs to report ratio SNR12/SNR22 to the base station. Since the link bandwidth is limited, this ratio can be quantized. When this ratio is expressed by one bit, the value of 0 indicates that suppression of the leak is unnecessary and the value of 1 indicates that suppression of the leak is necessary. When this ratio is expressed by two bits, the value of 00 indicates that suppression of the leak is unnecessary, the value of 01 indicates that suppression of the leak is a little necessary, the value of 10 indicates that the leak needs to be taken into consideration and the value of 11 indicates that the leak link is quite strong and the leak needs to be suppressed by all means. When the rate of change of the SNR is assumed to be very low, this value can also be expressed by more bits. When, for example, this ratio is expressed by one bit, if the ratio is smaller than 0.5, this bit can be set to 0 and set to 1 otherwise. When this ratio is expressed by two bits, if, for example, the ratio is smaller than 0.25, the feedback information can be set to 00, if the ratio is 0.25 to 0.5, the feedback information can be set to 01, if the ratio is 0.5 to 1, the feedback information can be set to 10 and if the ratio is greater than 1, the feedback information can be set to 11. The above described numbers are merely some examples shown for convenience. The present invention is not limited to this, but other numerical values can be set according to specific situations within the scope of the present invention.

Depending on the situation, SNR22 may have already been acquired by other methods (e.g. movement detection). In such a case, user station 2 needs to transmit, not SNR ratio SNR12/SNR22, but SNR12 which is the quantized SNR to base station 2. This is because when the ratio is transmitted, for example, in the case of one bit, the SNR ratio may have two types of values: 0 or 1. However, when the SNR itself is transmitted, the SNR ratio may have three types of values: 0/1 (leak need not be suppressed), 0/0 or 1/1 (leak needs to be suppressed), 1/0 (leak needs to be suppressed by all means). Therefore, the last situation may allow the performance of the precoding vector to be better optimized.

Furthermore, channel information exchanged is not limited to instantaneous channel information (e.g. h11→), but may be statistic characteristics (e.g. E[h11H→h11→]) of channel information. Since a change of statistic characteristics of a channel is by far slower than that of channel characteristics at the instant, it is possible to effectively reduce the amount of data exchanged through the backhaul link. When channel correlation is high, the statistic characteristics also effectively represent the user's directivity, and can thereby suppress inter-cell interference and enhance the necessary channel. In this case, taking account of the fact that a certain channel coefficient in the equation of the SLNR becomes a statistic variable, the method of optimizing the SLNR needs to be changed to a mathematical expected value that optimizes the SLNR.

Furthermore, a case has been described above where the base station has a plurality of antennas and the user station has one antenna. The present invention is not limited to this, and is also applicable to a case where the user station has a plurality of antennas. In such a case, following equation 7 can be used to express a spread SLNR.

(Equation 7)

$$SLNR_1 = \frac{\text{trace}(T_1^H H_{11}^H H_{11} T_1) \cdot P_1}{\sigma^2 + \frac{SNR_{12}}{SNR_{22}} \cdot \text{trace}(T_1^H H_{12}^H H_{12} T_1) \cdot P_1} \quad [7]$$

In equation 7, the precoding vector and channel vector are changed to precoding matrix (T1) and channel matrix (H11 and H12) respectively. Definitions of other variables are the same as those described above.

Figure 9:
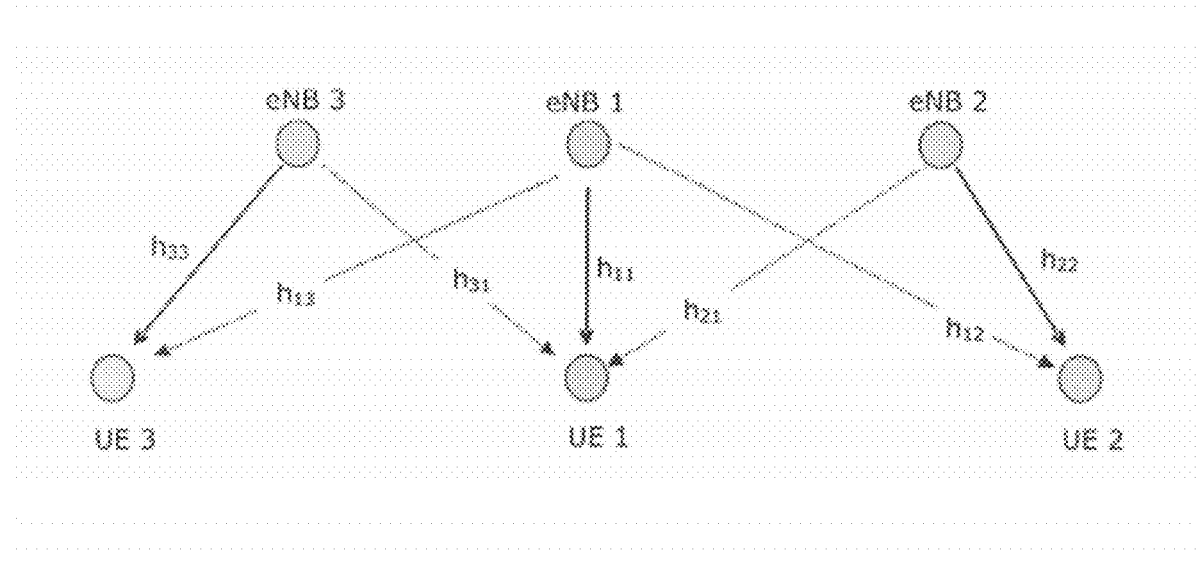
FIG. 9 shows an image illustrating a plurality of base stations communicating with user stations.

Furthermore, a situation has been described above in which a precoding vector of an appropriate base station is identified based on an SLNR by taking inter-cell interference between two base stations and two user stations as an example. The present invention is not limited to this, and is also applicable to a case with a plurality of base stations and a plurality of users. FIG. 9 shows a case with three base stations and three user stations. In FIG. 9, base station 2 and base station 3 produce leak interference with user station 1 and base station 1 produces leak interference with user station 2 and user station 3. In such a case, by adding an appropriate weighting coefficient, it is possible to show an optimized precoding vector of the appropriate base station. The equation is expressed as shown in equation 8 below.

(Equation 8)

$$SLNR_1 = \frac{\left|\vec{h}_{11}^H \cdot \vec{w}_1\right|^2 \cdot P_1}{\sigma^2 + \frac{SNR_{12}}{SNR_{22}} \cdot \left|\vec{h}_{12}^H \cdot \vec{w}_1\right|^2 \cdot P_1 + \frac{SNR_{13}}{SNR_{33}} \cdot \left|\vec{h}_{13}^H \cdot \vec{w}_1\right|^2 \cdot P_1} \quad [8]$$

The meaning of each variable in equation 8 is the same as the meaning of the variable in the equation of the SLNR described above.

In the above embodiment, the SNR ratio between the leak link and interfered link is used as a weighting coefficient. However, the present invention is not limited to this, and the SNR of the leak link may be used as a weighting coefficient. For example, as shown in equation 9 below, the SNR of the leak link is used as a weighting coefficient.

(Equation 9)

$$SLNR_1 = \frac{\left|\vec{h}_{11}^H \cdot \vec{w}_1\right|^2 \cdot P_1}{\sigma^2 + SNR_{12} \cdot \left|\vec{h}_{12}^H \cdot \vec{w}_1\right|^2 \cdot P_1} \quad [9]$$

Furthermore, the square root of the ratio between the SNR of the leak link and the SNR of the interfered link is used as a weighting coefficient and expressed as shown in equation 10 below.

(Equation 10)

$$SLNR_1 = \frac{\left|\vec{h}_{11}^H \cdot \vec{w}_1\right|^2 \cdot P_1}{\sigma^2 + \sqrt{\frac{SNR_{12}}{SNR_{22}}} \cdot \left|\vec{h}_{12}^H \cdot \vec{w}_1\right|^2 \cdot P_1} \quad [10]$$

Hereinafter, the structures and operations of the base station and user station according to the present invention will be described with reference to FIG. 10 and FIG. 11.

Figure 10:
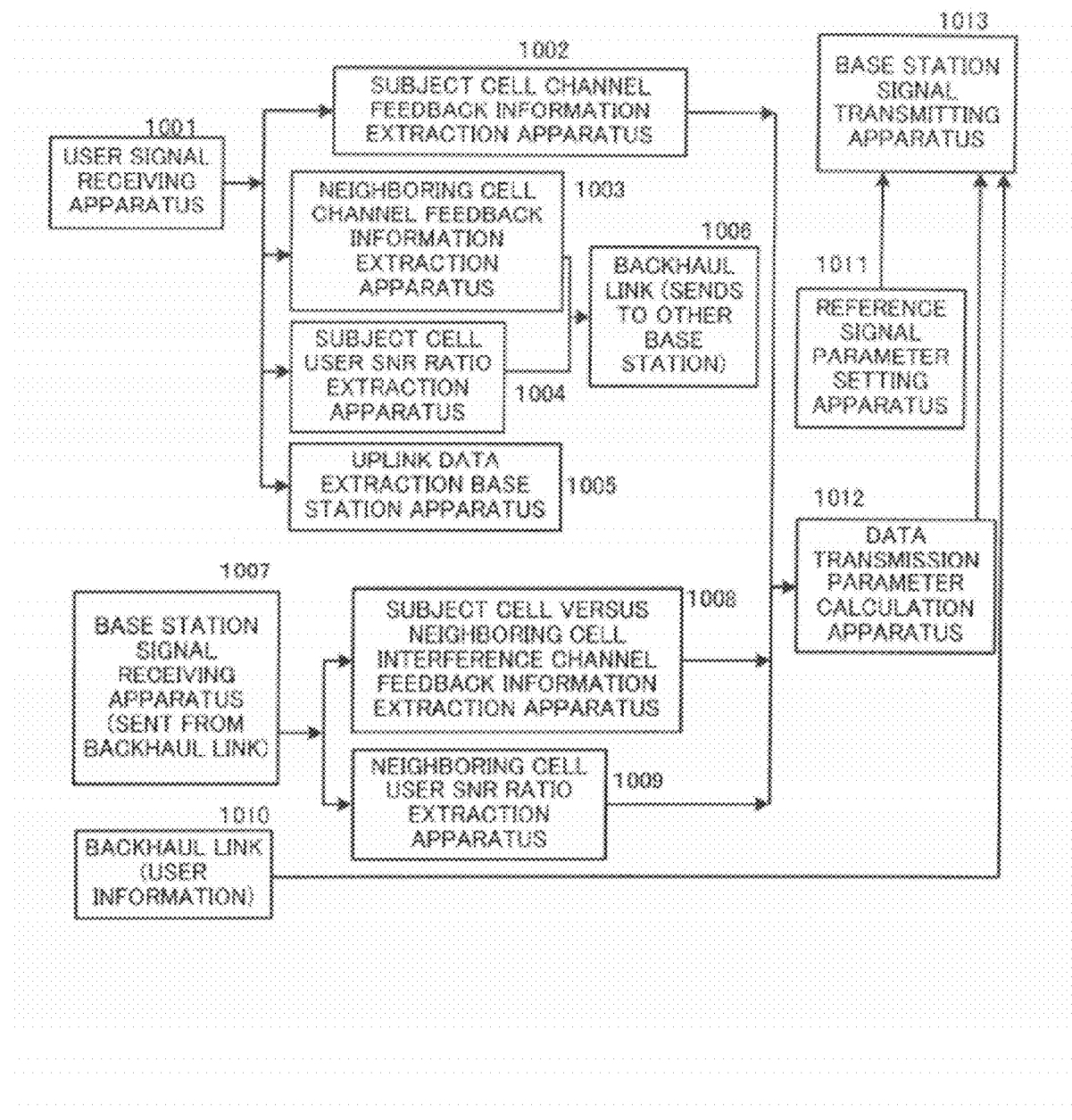
FIG. 10 shows an image illustrating an example of a structure of a base station side apparatus that reduces interference between base stations according to the present invention.

FIG. 10 shows an image of the structure of the base station according to the present invention. As shown in FIG. 10, the base station side is provided with user signal receiving apparatus 1001, subject cell channel feedback information extraction apparatus 1002, neighboring cell channel feedback information extraction apparatus 1003, subject cell user SNR ratio extraction apparatus 1004, uplink data extraction base station apparatus 1005, backhaul link 1006, base station signal receiving apparatus 1007, subject cell versus neighboring cell interference channel feedback information extraction apparatus 1008, neighboring cell user SNR ratio extraction apparatus 1009, backhaul link 1010, reference signal parameter setting apparatus 1011, data transmission parameter calculation apparatus 1012 and base station signal transmitting apparatus 1013.

Hereinafter, operations of the base station side apparatus that reduces interference between base stations according to the present invention will be described with reference to FIG. 10. User signal receiving apparatus 1001 receives a signal transmitted from the user of the subject cell, performs channel synchronization and channel equalization based on the received signal and demodulates and samples the received signal. The output of the user signal receiving apparatus 1001 is provided to subject cell channel feedback information extraction apparatus 1002, neighboring cell channel feedback information extraction apparatus 1003, subject cell user SNR ratio extraction apparatus 1004 and uplink data extraction base station apparatus 1005.

Subject cell channel feedback information extraction apparatus 1002 extracts downlink channel information of the subject cell (fed back to the base station from the user) from the received user signal and provides the downlink channel information to data transmission parameter calculation apparatus 1012. Neighboring cell channel feedback information extraction apparatus 1003 extracts downlink channel information of the neighboring cell (fed back to the base station from the user) from the received user signal and provides the downlink channel information to backhaul link 1006. Subject cell user SNR ratio extraction apparatus 1004 extracts the SNR ratio of the subject cell user (fed back to the base station from the user) from the received user signal and provides the SNR ratio to backhaul link 1006. Uplink data base station extraction apparatus 1005 extracts uplink data transmitted from the user to the base station from the received user signal. Backhaul link 1006 sends the received subject cell user information to a base station of another cell. Base station signal receiving apparatus 1007 receives information from the backhaul link, that is, receives other cell user information sent from the base station of the other cell and provides the other cell user information to subject cell versus neighboring cell interference channel feedback information extraction apparatus 100 and neighboring cell user SNR ratio extraction apparatus 1009.

Subject cell versus neighboring cell interference channel feedback information extraction apparatus 1008 extracts interference channel information on interference of the subject cell with the neighboring cell from the received other cell user information and provides the interference information to data transmission parameter calculation apparatus 1012. Neighboring cell user SNR ratio extraction apparatus 1009 receives the other cell user information from base station signal receiving apparatus 1007, extracts the SNR ratio of the neighboring cell user from the received other cell user information and provides the interference information to data transmission parameter calculation apparatus 1012.

Backhaul link 1010 receives the user information transmitted by the base station and provides the user information to transmit to base station signal transmitting apparatus 1013. Reference signal parameter setting apparatus 1011 sets a reference signal parameter. The reference signal is used to estimate downlink information of the subject cell or interference channel information on interference of the subject cell with the neighboring cell. Data transmission parameter calculation apparatus 1012 calculates a precoding matrix or precoding vector used for data transmission according to the received subject cell channel information, subject cell versus neighboring cell interference channel information and neighboring cell user SNR ratio information and provides the calculated precoding matrix or precoding vector to base station signal transmitting apparatus 1013. Base station signal transmitting apparatus 1013 transmits the downlink user data, reference signal, M-ary modulation value, coding rate and other control signals as to whether or not to perform retransmission from the base station based on the received reference signal parameter, data transmission parameter and user data that needs to be transmitted.

In the apparatus shown in FIG. 10, subject cell channel feedback information extraction apparatus 1002, neighboring cell channel feedback information extraction apparatus 1003, subject cell user SNR ratio extraction apparatus 1004, uplink data extraction base station apparatus 1005, subject cell versus neighboring cell interference channel feedback information extraction apparatus 1008 and neighboring cell user SNR ratio extraction apparatus 1009 can constitute an information extraction apparatus, and the information extraction apparatus extracts parameters necessary to calculate the SLNR, precoding matrix or precoding vector or the like from the received user information and signals transferred between the base stations. Examples thereof include a data channel coefficient and leak channel coefficient. Backhaul link 1006 and backhaul link 1010 can constitute a base station information exchange apparatus for exchanging information between the base stations.

Figure 11:
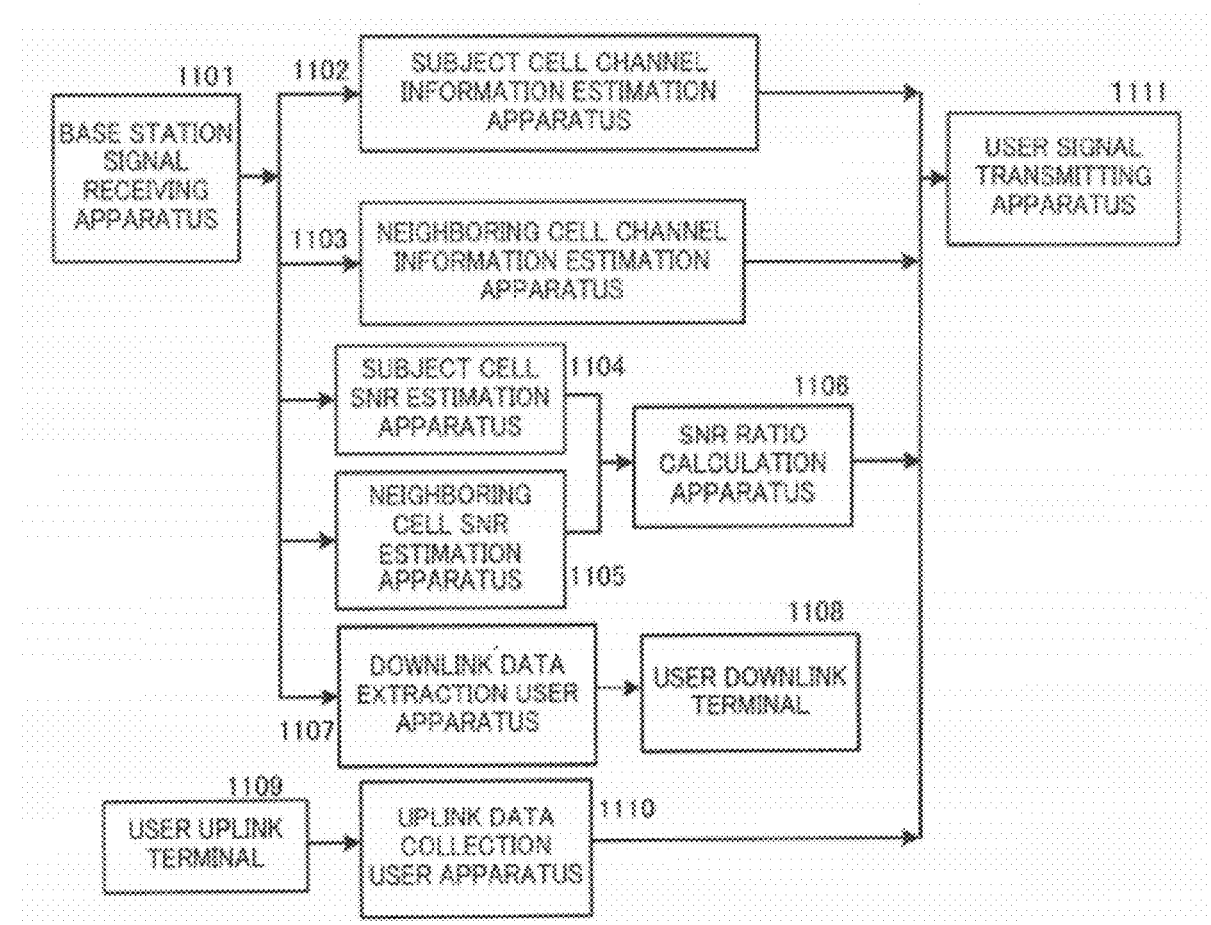
FIG. 11 shows an image illustrating an example of a structure of a user station side apparatus that reduces interference between base stations according to the present invention.

FIG. 11 shows an image of the structure of a user station side apparatus that reduces interference between base stations according to the present invention. As shown in FIG. 11, the user station side apparatus is provided with base station signal receiving apparatus 1101, subject cell channel information estimation apparatus 1102, neighboring cell channel information estimation apparatus 1103, subject cell SNR estimation apparatus 1104, neighboring cell SNR estimation apparatus 1105, SNR ratio calculation apparatus 1106, downlink data extraction user apparatus 1107, user downlink terminal 1108, user uplink terminal 1109, uplink data collection user apparatus 1110 and user signal transmitting apparatus 1111.

Hereinafter, operations of the user station side apparatus that reduces interference between base stations according to the present invention will be described with reference to FIG. 11. Base station signal receiving apparatus 1101 receives a signal transmitted from the base station of the subject cell and/or the base station of the neighboring cell, performs channel synchronization and channel equalization based on the received signal and demodulates and samples the received signal. The signal transmitted from the base station can include downlink user data, reference signal and other control signals or the like. Base station signal receiving apparatus 1101 provides the received signal to subject cell channel information estimation apparatus 1102, neighboring cell channel information estimation apparatus 1103, subject cell SNR estimation apparatus 1104, neighboring cell SNR estimation apparatus 1105 and downlink data extraction user apparatus 1107.

Subject cell channel information estimation apparatus 1102 estimates downlink channel information such as the data channel coefficient of the subject cell and leak channel coefficient from the subject cell reference signal provided from base station signal receiving apparatus 1101 and transmits downlink channel information of the estimated subject cell to user signal transmitting apparatus 1111. Neighboring cell channel information estimation apparatus 1103 collects the downlink channel information of the neighboring cell from the neighboring cell reference signal provided from base station signal receiving apparatus 1101 and transmits the estimated downlink channel information of the neighboring cell to user signal transmitting apparatus 1111. Subject cell SNR estimation apparatus 1104 estimates the SNR of the subject cell signal from the signal of the subject cell base station provided by base station signal receiving apparatus 1101 and provides the estimated SNR of the subject cell signal to SNR ratio calculation apparatus 1106. Neighboring cell SNR estimation apparatus 1105 estimates the SNR of the neighboring cell signal from the signal of the neighboring cell base station provided by base station signal receiving apparatus 1101 and provides the estimated SNR of the neighboring cell signal to SNR ratio calculation apparatus 1106. SNR ratio calculation apparatus 1106 calculates the ratio of the SNR of the received subject cell signal and the SNR of the neighboring cell signal and provides the calculated ratio to user signal transmitting apparatus 1111.

Downlink data extraction user apparatus 1107 extracts downlink data required by the user from the base station signal provided by base station signal receiving apparatus 1101 and transmits the downlink data to user downlink terminal 1108. User downlink terminal 1108 sends downlink data to the user, for example, the user's speaker and screen. User uplink terminal 1109 collects uplink data the user wants to transmit, for example, speech inputted from a microphone or data inputted from a keyboard and transmits the collected uplink data to uplink data collection user apparatus 1110. Uplink data collection user apparatus 1110 performs digitization such as analog/digital conversion, information source coding, data compression on the user uplink data and transmits the uplink data via user signal transmitting apparatus 1111.

In the user station side apparatus shown in FIG. 11, subject cell channel information estimation apparatus 1102, neighboring cell channel information estimation apparatus 1103, subject cell SNR estimation apparatus 1104, neighboring cell SNR estimation apparatus 1105 and downlink data extraction user apparatus 1107 can constitute an information extraction and estimation apparatus, the information extraction and estimation apparatus extracts information of the data channel and interference channel such as a data channel coefficient and leak channel coefficient from the signal transmitted by the base station, estimates the subject cell SNR and the neighboring cell SNR and extracts the downlink data. As the information exchange, the SNR ratio calculation apparatus calculates a precoding vector of the base station of the subject cell based on the calculated ratio or calculates a precoding vector of the base station of the neighboring cell based on the calculated ratio and user signal transmitting apparatus 1111 can transmit the calculated precoding vector to the base station of the subject cell.

The present invention is applicable not only to the case with coordination of a plurality of base stations but also to the following cases.

(1) Case with not only interference suppression through coordination of a plurality of base stations but also joint processing through coordination of a plurality of base stations.

(2) Case with not only coordination of a plurality of base stations on homogeneous network but also coordination of a plurality of base stations on heterogeneous network On the homogeneous network, different base stations have the same type. On the heterogeneous network, different base stations do not always have the same type, but may be base stations of different types. Examples of the types of base stations include 1) general base station (eNode B), 2) relay station (relay), 3) remote radio head and 4) Femto (Femto) (Home eNode B), but the types of base stations are not limited to these types.

(3) Case with not only coordination of a plurality of base stations but also case with single base station and a plurality of users.

The present invention has been described using the embodiments so far. Those skilled in the art can make various changes, updates and additions on the premise of not departing from the spirit and scope of the present invention. Therefore, the scope of the present invention is not limited to the above described specific embodiments, but is limited by the attached "claims."

Although the present invention has been described as an antenna in the above described embodiments, the present invention is likewise applicable to an antenna port.

The "antenna port" refers to a theoretical antenna made up of one or a plurality of physical antennas. That is, the antenna port does not always refer to one physical antenna, but may refer to an array antenna made up of a plurality of antennas.

For example, LTE does not define of how many physical antennas an antenna port is made up, but defines the antenna port as a minimum unit whereby a base station can transmit different reference signals.

Furthermore, the antenna port may be defined as a minimum unit whereby weighting of a precoding vector is multiplied.

Each function block employed in the description of the aforementioned embodiments may typically be implemented as an LSI constituted by an integrated circuit.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Chinese Patent Application No. 200910126854.3, filed on Mar. 20, 2009, including the specification, drawings and abstract, is incorporated herein by reference in its entirety.

The invention claimed is:

1. A method of reducing interference between base stations in a communication system with a plurality of base stations, the method comprising:
   a user station receiving signals transmitted from a base station in a subject cell and a base station in a neighboring cell and thereby measuring, at a processor of the user station, a signal to noise ratio (SNR) of an interfered link and an SNR of a leak link of the neighboring cell base station;
   calculating, at the processor of the user station, a weighting coefficient of leak power of each base station based on the measured SNR of the interfered link and the measured SNR of the leak link, the leak power being used for calculating a signal to leak and noise ratio (SLNR) of each base station;
   determining, at a processor of each base station, whether or not the leak power needs to be suppressed based on the calculated weighting coefficient; and
   calculating, at the processor of each base station, a precoding vector which maximizes the SLNR calculated using the leak power suppressed based on the determining result.

2. The method according to claim 1, wherein the weighting coefficient is a ratio between the SNR of the leak link and the SNR of the interfered link.

3. The method according to claim 1, wherein the SLNR is calculated based on a following equation:

$$SLNR_1 = \frac{\left|\vec{h}_{11}^H \cdot \vec{w}_1\right|^2 \cdot P_1}{\sigma^2 + \frac{SNR_{12}}{SNR_{22}} \cdot \left|\vec{h}_{12}^H \cdot \vec{w}_1\right|^2 \cdot P_1} \quad [1]$$

where SNR12 represents the SNR of the leak link, SNR22 represents the SNR of the interfered link, P1 represents transmission power of the subject cell, $\sigma^2$ represents noise power of the user station, w1→ represents the precoding vector of the subject cell base station, hmn→ represents a channel vector from base station m to user n, and m and n are integers.

4. The method according to claim 1, further comprising the base station transmitting data to the respective user stations based on the calculated precoding vector.

5. The method according to claim 1, further comprising the user station measuring a channel coefficient of the leak link and a channel coefficient of the data link.

6. The method according to claim 5, further comprising the user station feeding back the measured channel coefficient of the leak link and channel coefficient of the data link to the base station.

7. The method according to claim 6, further comprising the subject cell base station and the neighboring cell base station exchanging the channel coefficient of the leak link and the channel coefficient of the data link fed back from the user station.

8. The method according to claim 7, further comprising the subject cell base station transmitting the channel coefficient of the leak link and the channel coefficient of the data link exchanged with the neighboring cell base station to the user station.

9. The method according to claim 1, further comprising the user station side calculating the weighting coefficient.

10. The method according to claim 9, further comprising feeding back the calculated weighting coefficient to the subject cell base station.

11. The method according to claim 10, further comprising the subject cell base station and the neighboring base station exchanging the calculated weighting coefficient.

12. The method according to claim 1, wherein the weighting coefficient is the SNR of the leak link.

13. The method according to claim 12, wherein the SLNR is calculated based on a following equation:

$$SLNR_1 = \frac{\left|\vec{h}_{11}^H \cdot \vec{w}_1\right|^2 \cdot P_1}{\sigma^2 + SNR_{12} \cdot \left|\vec{h}_{12}^H \cdot \vec{w}_1\right|^2 \cdot P_1} \quad [2]$$

where SNR12 represents the SNR of the leak link, P1 represents transmission power of the subject cell base station, $\sigma^2$ represents noise power of the user station, w1→ represents the precoding vector of the subject cell base station, hmn→ represents a channel vector from base station m to user n, and m and n are integers.

14. The method according to claim 1, wherein the weighting coefficient is a square root of a ratio between the SNR of the leak link and the SNR of the interfered link.

15. The method according to claim 14, wherein the SLNR is calculated based on a following equation:

$$SLNR_1 = \frac{\left|\vec{h}_{11}^H \cdot \vec{w}_1\right|^2 \cdot P_1}{\sigma^2 + \sqrt{\frac{SNR_{12}}{SNR_{22}}} \cdot \left|\vec{h}_{12}^H \cdot \vec{w}_1\right|^2 \cdot P_1} \quad [3]$$

where SNR12 represents the SNR of the leak link, SNR22 represents the SNR of the interfered link, P1 represents transmission power of the subject cell, $\sigma^2$ represents noise power of the user station, w1→ represents the precoding vector of the subject cell base station, hmn→ represents a channel vector from base station m to user n, and m and n are integers.

16. The method according to claim 1, wherein the SLNR is calculated based on a following equation:

$$SLNR_1 = \frac{\left|\vec{h}_{11}^H \cdot \vec{w}_1\right|^2 \cdot P_1}{\sigma^2 + \frac{SNR_{12}}{SNR_{22}} \cdot \left|\vec{h}_{12}^H \cdot \vec{w}_1\right|^2 \cdot P_1 + \frac{SNR_{13}}{SNR_{33}} \cdot \left|\vec{h}_{13}^H \cdot \vec{w}_1\right|^2 \cdot P_1} \quad [4]$$

where SNR12 and SNR13 represent SNRs of the leak links respectively, SNR22 and SNR33 represent SNRs of the interfered link respectively, P1 represents transmission power of the subject cell base station, $\sigma^2$ represents noise power of the user station, w1→ represents the precoding vector of the subject cell base station, hmn→ represents a channel vector from base station m to user n, and m and n are integers.

17. The method according to claim 1, wherein the SLNR is calculated based on a following equation:

$$SLNR_1 = \frac{\text{trace}(T_1^H H_{11}^H H_{11} T_1) \cdot P_1}{\sigma^2 + \frac{SNR_{12}}{SNR_{22}} \cdot \text{trace}(T_1^H H_{12}^H H_{12} T_1) \cdot P_1} \quad [5]$$

where SNR12 represents the SNR of the leak link, SNR22 represents the SNR of the interfered link, P1 represents transmission power of the subject cell and neighboring cell base stations, $\sigma^2$ represents noise power of the user station, w1→ represents the precoding vector of the subject cell base station, hmn→ represents a channel vector from base station m to user n, and m and n are integers, both the precoding vector and channel vector are changed to T1 to represent a precoding matrix, and H11 and H12 represent channel matrices.

18. The method according to claim 1, further comprising determining to what degree the leak power needs to be suppressed based on the calculated weighting coefficient.

19. Equipment that reduces interference between base stations in a communication system with a plurality of base stations, the equipment comprising:
an information extraction apparatus that extracts subject cell channel information and neighboring cell channel information, a ratio of a user SNR in a subject cell and a ratio of a user SNR in a neighboring cell from a received user signal;
a data transmission parameter calculation apparatus that calculates a precoding matrix or precoding vector used for data transmission based on the received subject cell channel information, interference channel information on interference of the subject cell with the neighboring cell and the ratio of the user SNR in the neighboring cell, the calculating precoding matrix or precoding vector maximizing a signal to leak and noise ratio (SLNR) calculated using leak power of the base station, and the ratio of the user SNR in the neighboring cell being used for determining whether or not the leak power needs to be suppressed;

a reference signal parameter setting apparatus that sets a reference signal parameter and estimates subject cell downlink information or interference channel information on interference of the subject cell with the neighboring cell;

a base station information exchange apparatus that exchanges information between the base stations; and a base station signal transmitting apparatus that transmits data from the base station based on the set reference signal parameter and the calculated precoding matrix or precoding vector.

20. The equipment according to claim 19, wherein the subject cell channel information and the neighboring cell channel information include a data channel coefficient and a leak channel coefficient.

21. The equipment according to claim 19, wherein the information extraction apparatus comprises:

a subject cell channel feedback information extraction apparatus that extracts downlink channel information of the subject cell from the received user signal and provides the downlink channel information to the data transmission parameter calculation apparatus;

a neighboring cell channel feedback information extraction apparatus that extracts downlink channel information of the neighboring cell from the received user signal and provides the downlink channel information to a backhaul link;

a subject cell user SNR ratio extraction apparatus that extracts the ratio of the user SNR in the subject cell from the received user signal and provides the SNR ratio to the backhaul link;

uplink data extraction base station apparatus that extracts the uplink data transmitted by the user to the base station from the received user signal;

a subject cell versus neighboring cell interference channel feedback information extraction apparatus that extracts interference channel information on interference of the subject cell with the neighboring cell from the received other cell user information and provides the interference channel information to the data transmission parameter calculation apparatus; and a neighboring cell user SNR ratio extraction apparatus that receives other cell user information, extracts the ratio of the user SNR in the neighboring cell and provides the ratio to the data transmission parameter calculation apparatus.

22. Equipment that reduces interference between base stations in a communication system with a plurality of base stations, the equipment comprising:

an information extraction and estimation apparatus that extracts data channel information and interference channel information from a signal transmitted from a base station and estimates a subject cell SNR and a neighboring cell SNR;

an SNR ratio calculation apparatus that calculates a ratio between the estimated subject cell SNR and neighboring cell SNR and provides the calculated ratio to a user signal transmitting apparatus, the calculated ratio being a weighting coefficient of leak power used for calculating a signal to leak and noise ratio (SLNR) of the base station; and a user signal transmitting apparatus that transmits the calculated ratio and user uplink data.

23. The equipment according to claim 22, wherein the SNR ratio calculation apparatus calculates a precoding vector of the subject cell base station based on the calculated ratio.

24. The equipment according to claim 23, wherein the SNR ratio calculation apparatus calculates a precoding vector of the neighboring cell base station based on the calculated ratio.

25. The equipment according to claim 23, wherein the information extraction and estimation apparatus comprises:

a subject cell channel information estimation apparatus that estimates downlink channel information of the subject cell and transmits the estimated downlink channel information to the user signal transmitting apparatus;

a neighboring cell channel information estimation apparatus that collects downlink channel information of the neighboring cell from a neighboring cell reference signal and transmits the estimated downlink channel information of the neighboring cell to the user signal transmitting apparatus;

a subject cell SNR estimation apparatus that estimates an SNR of the subject cell signal from the signal transmitted from the subject cell base station and provides the SNR of the estimated subject cell signal to the SNR ratio calculation apparatus; and a neighboring cell SNR estimation apparatus that estimates an SNR of the neighboring cell signal from the signal transmitted from the neighboring cell base station and provides the estimated SNR of the neighboring cell signal to the SNR ratio calculation apparatus.

* * * * *